Oct. 14, 1947.  W. H. HUNTER  2,429,061
COUNTER-ROTATING PROPELLER ASSEMBLY
Filed Oct. 28, 1943  2 Sheets-Sheet 1
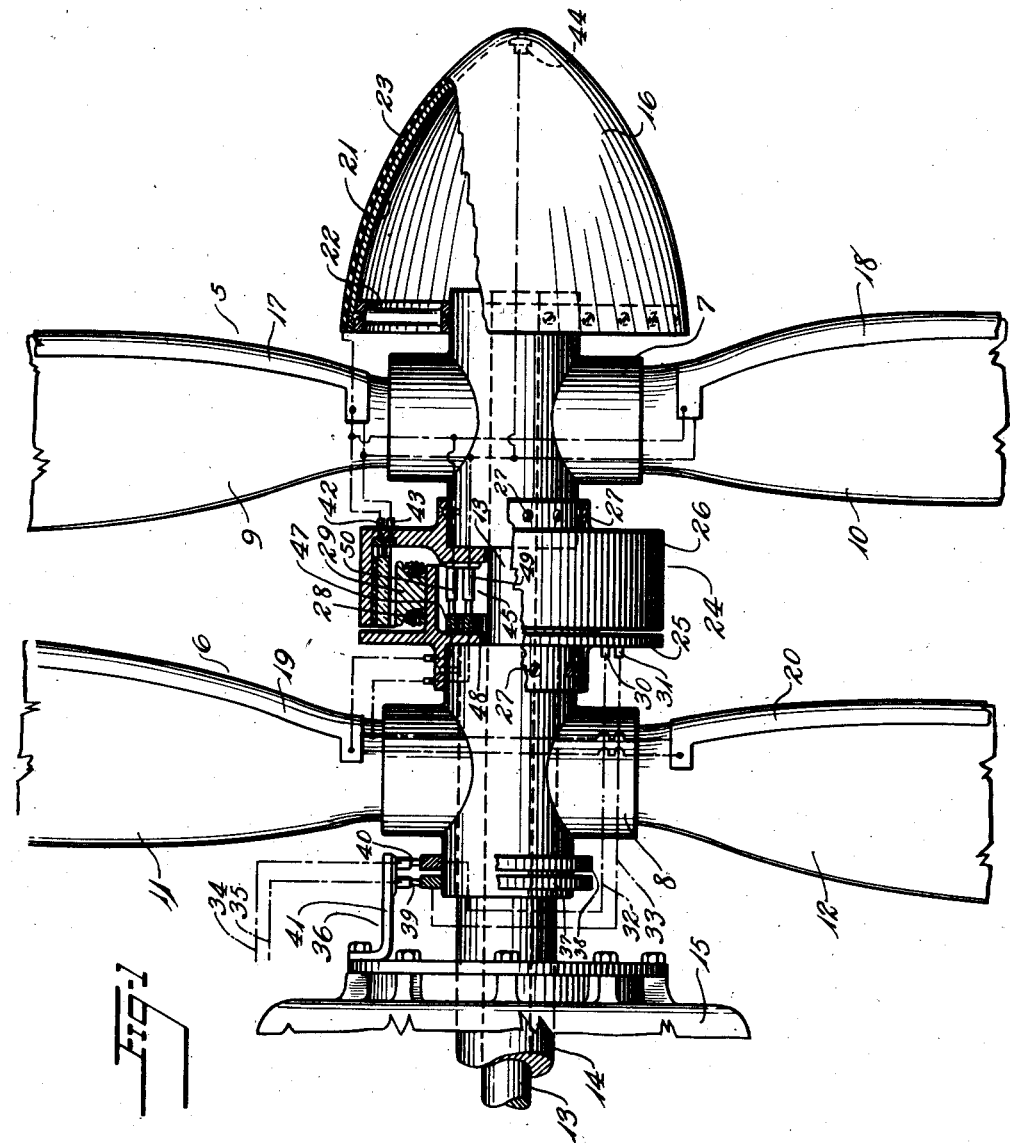
Inventor
Willson H. Hunter
By Willis F. Avery
Atty.

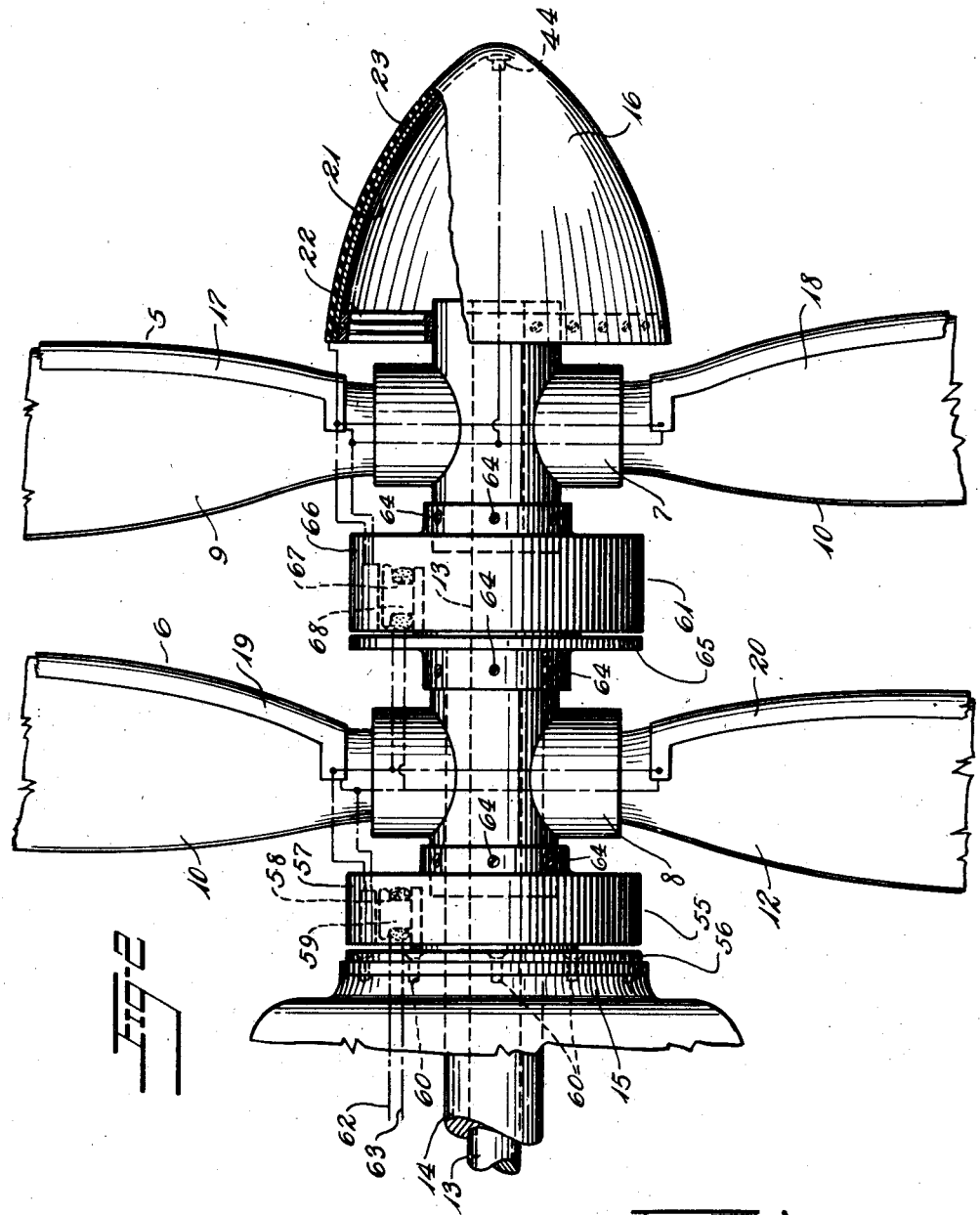

Patented Oct. 14, 1947

2,429,061

UNITED STATES PATENT OFFICE 2,429,061

COUNTER-ROTATING PROPELLER ASSEMBLY

Willson H. Hunter, Akron, Ohio, assignor to The B. F. Goodrich Company, New York, N. Y., a corporation of New York Application October 28, 1943, Serial No. 508,037

6 Claims. (Cl. 244—134)

This invention relates to counter-rotating propeller assemblies and especially to the provision in such assemblies of electrical heating means for preventing the accumulation of ice.

Principal objects of the invention are to provide for utilizing to advantage the counter-rotation of the propellers for generating the electrical current; to provide generating means including associated field and armature elements one of which is rotatable with a propeller and the other of which is rotatable relative to the first said element and relative to the propeller and to a support for the propeller assembly; to provide for conducting the current from the armature to the apparatus notwithstanding the counter-rotation of the elements of the generating means; and to provide effectiveness of operation, simplicity of construction and convenience of manufacture.

Other objects are to provide for electrically heating the blades of the counter-rotating propeller assembly; to provide a generator having an element rotatable with one of the propellers of the assembly and another element associated therewith rotatable with the other propeller; and to provide means on the relatively rotatable elements of the generator for transferring the current from the armature to the heating means on the blades of the counter-rotating propellers.

These and other objects and advantages of the invention will be apparent from the following description.

In the accompanying drawings, which form a part of this specification and in which like numerals are employed to designate like parts throughout the same, Fig. 1 is a side elevation of a counter-rotating propeller assembly including a spinner and a generator constructed in accordance with and embodying the invention, parts being broken away and in section, and Fig. 2 is a view like Fig. 1 but showing a modified construction of the propeller assembly including dual generators.

In the illustrative embodiment of the invention shown in Fig. 1, a pair of spaced-apart propellers 5 and 6 including hub fittings 7 and 8 and blades 9 to 12 are secured to and mounted on counter-rotating drive shafts 13 and 14 projecting from a support 15 such, for example, as an aircraft engine casing. The aircraft propelling arrangement may be of the tractor type or the pusher type or both; and for the tractor type shown in Fig. 1, a spinner 16 may be mounted at the front of the leading propeller 5 in the manner shown for facilitating substantially smooth flow of air at the frontal region of the hub fitting 7 and the root portions of the blades 9 and 10 of such propeller. If desired, a suitable cowling (not shown) may be provided at the propellers 5 and 6 and the support 15 in continuation of the spinner 16 for further promoting flow of air.

The propellers 5 and 6 as shown in Fig. 1 are each of the fixed two-blade tractor type but may be of other types, if desired. Protective coverings 17 to 20 comprising resilient rubber or rubber-like material may be provided at the leading edges of the blades 9 to 12 of the propellers for preventing ice accumulation on the blades, which coverings include electrically conductive rubber or other material adapted to be heated electrically and are secured to the blades, as by a rubber cement, or other suitable fastening means. The spinner 16 comprising an open-end conoidal hollow member 21 of stiff material such, for example, as aluminum alloy sheet metal and having an attaching structure 22, may also be provided with a protective covering 23 including resilient rubber or other rubber-like material capable of being heated electrically for preventing the accumulation of ice thereon. The covering 23 may be adhered to the hollow member 21 of the spinner 16 by a suitable cement or attached thereto by other suitable fastening means.

For providing an assured source of electrical current, a generating means 24 is disposed axially between the spaced-apart propellers 5 and 6 as shown in Fig. 1, and so arranged that an element of the same is rotatable with a propeller of the assembly and another element of which is rotatable relative to the first said element, to the propeller, and to the support 15.

The generating means 24 includes an annular field element or structure 25 rotatable with the propeller 6 and an annular armature element or structure 26 associated with the field element 25 and rotatable with the other propeller 5 of the assembly. The field structure 25 may be attached to the hub fitting 8 of the propeller 6 by circumferentially spaced-apart screws 27 or by other suitable fastening means in the manner shown in Fig. 1. The armature structure 26 may in like manner be attached to the hub fitting 7 of the other propeller 5.

Although permanent magnet poles may be used in the field structure 25, it is desirable that field coils or windings 28 be provided for the magnetization of poles 29 of the field structure for facilitating control of the generation of electrical current thereby permitting control of the heating of the protective coverings 17 to 20 and 23 of the respective propellers and the spinner. A suitable source of electrical current for energizing the field windings 28 may be disposed at a suitable location in the body of the aircraft, for example, and is connected to terminals 30 and 31 of such windings on the field structure 25 by suitable wire conduits 32 to 35 and by a current transfer mechanism 36, the wire connections 32 to 35 being shown diagrammatically by broken lines. Suitable control means located on the aircraft may be provided in the electrical circuit of the field windings for controlling the flow of electrical current therethrough. The current transfer apparatus 36 includes a pair of spaced-apart slip ring elements 37 and 38 which elements may be secured to and mounted axially on the hub fitting 8 adjacent the engine casing 15 and includes sliding contactor elements 39 and 40 which may be suitably mounted on a supporting bracket 41 attached to the engine casing 15 in the manner shown in Fig. 1. Thus the field windings may be energized notwithstanding their rotation with the propeller 6 of the assembly relative to the support 15.

The protective coverings 17 to 20 on the blades of the propellers 5 and 6 and the covering 23 on the spinner 16 are electrically connected in parallel by suitable wire connections to the armature structure 26 at terminals 42 and 43 thereon for conducting the current for heating such coverings, the wire connections being shown diagrammatically by broken lines. The connections to the spinner 16 may be made to the margin of the covering 23 at the open-end of the spinner and to a terminal element 44 at the longitudinal axis of the frontal portion of the spinner in electrical contact with the covering 23.

For transferring the current from the armature structure 26 to the coverings 19 and 20 on the counter-rotating propeller 6, a relatively rotatable current transfer means 45 is provided on the field structure 25 and the armature structure 26. The means 45 includes a pair of spaced-apart slip ring elements 47 and 48 secured to and mounted on the field structure 25 desirably in the space between the poles 29 and the drive shaft 13 as shown in Fig. 1, and includes sliding contactor elements 49 and 50 suitably mounted on the armature structure 26 in axial register with the slip ring elements 47 and 48. The slip ring elements and the contactor elements are connected to the electrical connections conducting the heating current to the coverings thereby completing the electrical circuit and facilitating heating of such coverings despite the counter-rotation of the propellers and the spinner.

In the operation of the assembly and with the propellers 5 and 6 rotating in counter-rotative directions relative to the support 15 or engine casing, the field winding 28 is energized by the electrical current flowing from the source of supply in the aircraft through the wire connections 32 and 33, 34 and 35, and the current transfer apparatus 36 to the terminals 30 and 31 of the windings 28 of the rotating field structure 25 of the generating means 24. The magnetization of the field poles 29 may be controlled by varying the energizing current of the windings 28 as described hereinabove whereby the magnitude of the heating current generated in the armature structure may be varied for controlling the heating of the coverings as desired for the icing conditions being encountered in flight.

During the rotation of the armature structure 26 with the propeller 5 in the opposite direction to that of the rotating field structure 25, the current generated in the armature structure flows therefrom through the respective wire conduits and the current transfer means 45 to the protective coverings on the propellers and the spinner. Such current from the armature structure flows through the several coverings and causes heating of the same to occur which heating effect may be controlled as described hereinabove for preventing effectively the accumulation of ice on the propeller blades and the spinner of the assembly.

The modified arrangement of the counter-rotating propeller assembly shown in Fig. 2 may be desirable for some applications and is like the construction shown in Fig. 1 in some of its aspects. Such modified assembly comprises spaced-apart propellers 5 and 6 including hub fittings 7 and 8 and blades 9 to 12 secured to and mounted on the counter-rotating drive shafts 13 and 14 projecting from the support 15 or engine casing. A spinner 16 may be provided which is rotatable with and mounted at the front of the hub fitting 7 of the leading propeller 5 for facilitating substantially smooth flow of air at the frontal region of the hub and the root portions of the blades 9 and 10 of such propeller. The spinner 16 includes an open-end conoidal hollow member 21 of aluminum alloy sheet metal, an attaching structure 22, and a protective covering 23 including rubber-like material adapted to be heated electrically for preventing ice accumulation thereon. The covering 23 may be adhered to the metal member 21 by a suitable adhesive such, for example, as rubber cement or may be secured thereto by other suitable fastening means.

Electrically heated protective coverings 17 to 20 including resilient rubber-like material may be provided at the leading edges of the blades 9 to 12 of the propellers 5 and 6 of the assembly for preventing the accumulation of ice and are desirably adhered to the blades by a suitable cement.

For providing electrical current for heating the protective coverings of the propellers and the spinner, a generating means 55 is disposed between the engine casing 15 and the rear propeller 5 and a second generating means 61 is disposed between the spaced-apart propellers 5 and 6 although other suitable locations in the assembly may be used for the generating means 55 and 61, especially for the generating means 61. The generating means 55 comprises a non-rotatable annular field element or structure 56 attached at the frontal face of the engine casing 15 by a plurality of circumferentially spaced-apart screws 60 or other suitable fastening means, and comprises an associated annular armature element or structure 57 rotatable with the rear propeller 6 and secured to the hub fitting 8 as by screws 64. The field structure 56 includes field coils or windings 58 and poles 59 for providing the magnetic field in which the armature structure 57 rotates. The field windings 58 are energized by electrical current from a suitable source in the aircraft, the current flowing through connecting wire conduits 62 and 63, shown by the broken lines. Suitable control means may be provided in such electrical circuit for controlling the energizing of the field windings 58.

Electrical current generated in the armature structure 57 is conducted by wire conduits electrically in parallel to the protective coverings 19 and 20 on the propeller 6 for heating these coverings and to the second generating means 61 for energizing the field of the latter means, the wire conduits being shown diagrammatically by broken lines.

The second generating means 61 comprises an annular field element or structure 65 rotatable with and attached to the rear propeller 6 at the hub fitting 8 as by screws 64 and comprises an annular armature element or structure 66 associated with the field structure 65 and rotatable with and attached to the front propeller 5 at the hub fitting 7 as by screws 64. The field structure 65 includes field coils or windings 67 and poles 68 for providing the desired magnetic field for the armature structure 66 and, if desired, suitable control means may be provided in the energizing circuit for the field windings 65 for controlling the magnitude of the magnetic field and thus the generating current for heating the covering 17 and 18 of the front propeller 5 and the covering 23 of the spinner 16.

Suitable wire connections, shown diagrammatically by broken lines and connected electrically in parallel, conduct the generated current from the armature structure 66 to the coverings of the propeller 5 and the spinner 16. The leads to the spinner 16 may be connected to the margin of the covering 23 and to the terminal element 44 electrically contacting the covering 23.

In the operation of the embodiment shown in Fig. 2 and with the propellers 5 and 6 rotating in counter-rotative directions relative to the support 15, the field windings 58 of the field structure 56 are energized by electrical current from the source of supply in the aircraft. The generated current flows through the wire conduits from the armature structure 57 to the protective coverings 19 and 20 on the propeller 6 for heating such coverings and flows to the field windings 67 of the second field structure 65 for energizing the windings 67.

The current generated by the second generating means 61 flows through the wire conduits from the second armature structure 66 to the protective coverings 17 and 18 on the propeller 5 and to the protective covering 23 on the spinner for heating such coverings 17, 18 and 23. In this manner the coverings of the propellers and spinner are maintained in a heated condition for preventing ice accumulation thereon despite the counter-rotation of such propellers and the heating effect may be controlled automatically or manually as desired.

Variations may be made without departing from the scope of the invention as it is defined in the following claims.

I claim:

1. In an aircraft assembly having propellers rotatable coaxially relative to a support in counter-rotative directions, in combination, electrical heating means for the blades of said propellers means for generating electrical current for said heating means, the generating means being mounted coaxially with and between said propellers at the hub of a propeller and comprising a field element and an armature element associated with said field element, an element of which is rotatable with a propeller of the assembly and the other element of which is rotatable relative to the first said element and to said propeller and to said support, and means for conducting the current from said armature element to said heating means.

2. In an aircraft assembly having propellers rotatable coaxially relative to a support in counter-rotative directions, in combination, covering means at the leading edges of the blades of said propellers capable of being heated electrically, means mounted coaxially with and between said propellers at the hub of a propeller for generating electrical current for heating said covering means, the generating means comprising a field element and an associated armature element, an element of which is rotatable with a propeller of the assembly and the other element of which is rotatable relative to the first said element and to said propeller and to said support, and means for conducting the current from said armature element to said covering means.

3. In an aircraft assembly having coaxial counter-rotating propellers, in combination, covering means at the leading edges of the blades of said propellers capable of being heated electrically, means mounted coaxially with and between said propellers at the hub of a propeller for generating electrical current for heating said covering means, the generating means comprising a field structure rotatable with one of said propellers and an armature structure associated with said field structure and rotatable with the other of said propellers, and means for conducting the current from said armature structure to said covering means.

4. In an aircraft assembly having coaxial counter-rotating propellers and having a spinner coaxially rotatable with one of said propellers, in combination, covering means at the leading edges of the blades of said propellers and on said spinner capable of being heated electrically, means for generating electrical current for heating said covering means, the generating means comprising a generator mounted coaxially with and between said propellers including a field structure rotatable with one of said propellers and an armature structure associated with said field structure and rotatable with the other of said propellers, and means for conducting the current from said armature structure to said covering means of said propellers and said spinner.

5. In an aircraft assembly having propellers rotatable coaxially relative to a support in counter-rotative directions, in combination, electrical heating means for the blades of said propellers, means mounted coaxially with and between said propellers at the hub of a propeller for generating electrical current for said heating means of a propeller of the assembly, the generating means comprising a field element and an armature element associated with said field element, an element of which is rotatable with said propeller and the other element which is rotatable relative to the first said element and to said propeller and to said support, a second means mounted coaxially with said propellers intermediate another propeller of the assembly and said support at the hub of the latter propeller for generating electrical current for said heating means of said another propeller of said assembly comprising a second field element and an associated second armature element rotatable with the latter said propeller and relative to said second field element, and means for conducting the current from said armature elements to said heating means.

6. In an aircraft assembly having propellers rotatable coaxially relative to a support in counter-rotative directions, in combination, covering means at the leading edges of the blades of said propellers capable of being heated electrically, means for generating electrical current for heating said covering means of a propeller of the assembly, the generating means being mounted coaxially with and between said propellers at the hub of a propeller and comprising a field element and an armature element associated with said field element, an element of which is rotatable with said propeller and the other element of which is rotatable relative to the first said element and to said propeller and to said support, a second means for generating electrical current for heating said covering means of another propeller of said assembly, the second generating means being mounted coaxially with said propellers intermediate said another propeller and said support at the hub of the latter propeller and comprising a second field element non-rotatably mounted with respect to said support and an associated armature element rotatable with the latter said propeller relative to said second field element, and means for conducting the current from said armature elements to said covering means.

WILLSON H. HUNTER.

REFERENCES CITED

The following references are of record in the file of this patent:

UNITED STATES PATENTS

| Number | Name | Date |
| --- | --- | --- |
| 1,846,468 | Benson | Feb. 23, 1932 |
| 1,294,361 | Nash | Feb. 11, 1919 |
| 2,121,073 | Bothezat | June 21, 1938 |
| 2,177,801 | Erren | Oct. 31, 1939 |
| 1,894,357 | Manikowski | Jan. 17, 1933 |
| 1,561,424 | Exel | Nov. 10, 1925 |
| 2,120,821 | Waseige | June 14, 1938 |
| 2,327,370 | Pullin | Aug. 24, 1943 |
| 1,052,658 | Escher | Feb. 11, 1913 |
| 774,168 | Fornander | Nov. 8, 1904 |

FOREIGN PATENTS

| Number | Country | Date |
| --- | --- | --- |
| 414,399 | Great Britain | July 31, 1934 |